US008015281B2

(12) United States Patent
Baker et al.

(10) Patent No.: US 8,015,281 B2
(45) Date of Patent: Sep. 6, 2011

(54) DYNAMIC SERVER FLOW CONTROL IN A HYBRID PEER-TO-PEER NETWORK

(75) Inventors: Graham Baker, Londonderry, NH (US); Leon James Alexandrou, Marblehead, MA (US)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 12/106,343

(22) Filed: Apr. 21, 2008

(65) Prior Publication Data

US 2009/0265458 A1   Oct. 22, 2009

(51) Int. Cl.
*G06F 15/16* (2006.01)
(52) U.S. Cl. .................... 709/224; 370/232; 370/235
(58) Field of Classification Search .......... 709/203, 709/232, 224; 370/241, 329, 401, 468, 232, 370/235
See application file for complete search history.

(56) References Cited

U.S. PATENT DOCUMENTS

| | | | |
|---|---|---|---|
| 6,460,082 B1 | 10/2002 | Lumelsky et al. | |
| 6,584,489 B1 | 6/2003 | Jones et al. | |
| 7,257,635 B2 | 8/2007 | Chellis et al. | |
| 7,274,780 B1 | 9/2007 | Gawande et al. | |
| 7,694,008 B2 * | 4/2010 | Chang et al. | 709/232 |
| 2002/0138643 A1 | 9/2002 | Shin et al. | |
| 2003/0046396 A1 | 3/2003 | Richter et al. | |
| 2004/0267897 A1 | 12/2004 | Hill et al. | |
| 2005/0018611 A1 * | 1/2005 | Chan et al. | 370/241 |
| 2006/0007934 A1 | 1/2006 | Chemiakina et al. | |
| 2006/0013132 A1 | 1/2006 | Garnett et al. | |
| 2007/0076754 A1 * | 4/2007 | Krishnaswamy | 370/468 |
| 2007/0088826 A1 | 4/2007 | Raphel et al. | |
| 2008/0151917 A1 * | 6/2008 | Bartlett et al. | 370/401 |
| 2009/0034457 A1 * | 2/2009 | Bahl et al. | 370/329 |
| 2010/0262655 A1 * | 10/2010 | Raphel et al. | 709/203 |

OTHER PUBLICATIONS

He, et al., "Feedback Control-based Dynamic Resource Management in Distributed Real-Time Systems", Elsevier Journal of Systems and Software, Special Issue on Dynamic Resource Management in Distributed Real-Time Systems, Elsevier Science Inc., Jul. 2007, vol. 80, Issue 7, pp. 1-20.

Czajkowski, et al., "Resource Management for Extensible Internet Servers", Proceedings of the 8th ACM SIGOPS European workshop on Support for composing distributed applications, ACM, 1998, pp. 7.

Judd, et al., "QoS-based Resource Allocation in Dynamic Real-Time Systems" Proceedings of the 2005 American Control Conference, vol. 3, AACC, 2005, pp. 1745-1751.

* cited by examiner

*Primary Examiner* — Jungwon Chang
(74) *Attorney, Agent, or Firm* — Hope Baldauff Hartman, LLC

(57) ABSTRACT

Technologies are described herein for providing dynamic flow control of requests to a server in a hybrid peer-to-peer network. The server collects a number of metrics related to its current stability and the throughput of requests from peer-to-peer devices. These metrics, along with associated trend data, are used by the server to calculate a current stability rating and a current throughput rating. The server then imposes flow control on a proportional number of the peer-to-peer devices based upon the current ratings. This operation is run periodically, with ratings re-calculated from current metrics, and new flow control measures imposed in each cycle.

17 Claims, 4 Drawing Sheets

DYNAMIC SERVER FLOW CONTROL IN A HYBRID PEER-TO-PEER NETWORK

BACKGROUND

Many software applications require the communication of documents and other information among multiple users located at multiple computers, such as collaboration software, portfolio management applications, and workgroup support systems. These types of applications may be deployed upon traditional client-server network architectures, where a central server maintains the documents and other information, or peer-to-peer (P2P) networks. P2P networks have an advantage over client-server architectures in that the peer-to-peer computers or devices provide the resources, such as bandwidth, storage space, and computing power. Thus, as there is more demand on the P2P network by the addition of more peer-to-peer devices, the total capacity of the system also increases, unlike traditional client-server networks where adding more clients can result in slower processing for all users. P2P networks also provide redundancy by replicating data over multiple peer-to-peer devices, and thus there is no single point of failure in the system, as may exist in traditional client-server architectures.

However, as the underlying network architecture of a P2P network gets more complicated, there arises a need for some services to become centralized, resulting in a hybrid P2P system. For instance, a P2P network in which the peer-to-peer devices are located on diverse networks and separated by firewalls or proxies may require a central server that knows about the devices participating in the P2P network and routes information between the remote peer-to-peer devices. An example of this type of hybrid P2P network is the MICROSOFT OFFICE GROOVE collaboration software from MICROSOFT CORPORATION of Redmond, Wash. In a GROOVE hybrid P2P implementation, individual peer-to-peer devices may inform a central relay server of changes to resources owned by that device, and the relay server may forward the changes to other devices participating in the P2P network. This allows for the efficient distribution of changes to other peer-to-peer devices that may not be directly connected to the central network or may connect at a later time.

With potentially thousands of devices participating in such a hybrid P2P network, the processing load on a relay server can become very high, potentially causing server instability that can lead to a crash or the dropping of requests from peer-to-peer devices. It is essential, therefore, that the relay server implements a flow control mechanism to prevent this instability and to ensure that device messages continue to be forwarded. However, traditional control mechanisms are generally limited to static hysteresis mechanisms, wherein simple flow control is imposed on all devices when resource utilization, such as the number of connections, reaches a threshold value or "high water mark", and removed again when utilization drops below an associated "low water mark". These mechanisms often do not take into account the true, current performance and processing load on the server, which may vary depending upon the size and number of requests being made to the relay server as well as processing resources required by other applications executing on the server computer at the same time.

It is with respect to these considerations and others that the disclosure made herein is presented.

SUMMARY

Technologies are described herein for providing dynamic flow control of requests to a server in a hybrid peer-to-peer network. In particular, a method is provided for a server to monitor its current stability and the throughput of requests from connected peer-to-peer devices, and impose flow control on the connected devices accordingly. According to aspects presented herein, the server collects a number of metrics related to the current processing load on the server and the number and size of requests from devices over a specific period of time. From these metrics, the server calculates a current stability rating and a current throughput rating. The server then imposes flow control on a subset of the connected devices in proportion to the current ratings calculated for the server. This operation is run continuously, with ratings re-calculated from current metrics, and new flow control measures imposed in each cycle.

In one aspect, the metrics collected may include the total number of requests to the server from the connected devices over a period of time, the total size of the requests over that period of time, the current processor utilization of the server, the current paging rate, the rate of disk read and write requests, the rate of database transactions from the server, and the number of bytes of free memory remaining in the server. In another aspect, the server also calculates trend data for each of the collected metrics, and utilizes the trend data in the calculation of the current stability and throughput ratings.

According to one aspect presented herein, different levels of flow control are imposed by comparing the current ratings to a maximum threshold value and a nominal threshold value, with the imposition of flow control on all devices if the rating exceeds the maximum threshold, and no flow control imposed if the rating is less than the nominal value. If the current rating falls between the nominal and maximum thresholds, flow control is imposed on a subset of the connected devices having the heaviest utilization of the server. In another aspect, the size of the subset of connected devices upon which flow control is imposed may vary by further comparing the ratings to intermediate threshold values. In accordance with aspects presented herein, methods of imposing flow control on a subset of connected devices include utilizing a command of the connection protocol used by the devices to instruct each of the devices to limit the throughput of requests to the server, imposing a limit on the number of requests accepted from each device over a period of time, or limiting the number of devices that can be connected to the server.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
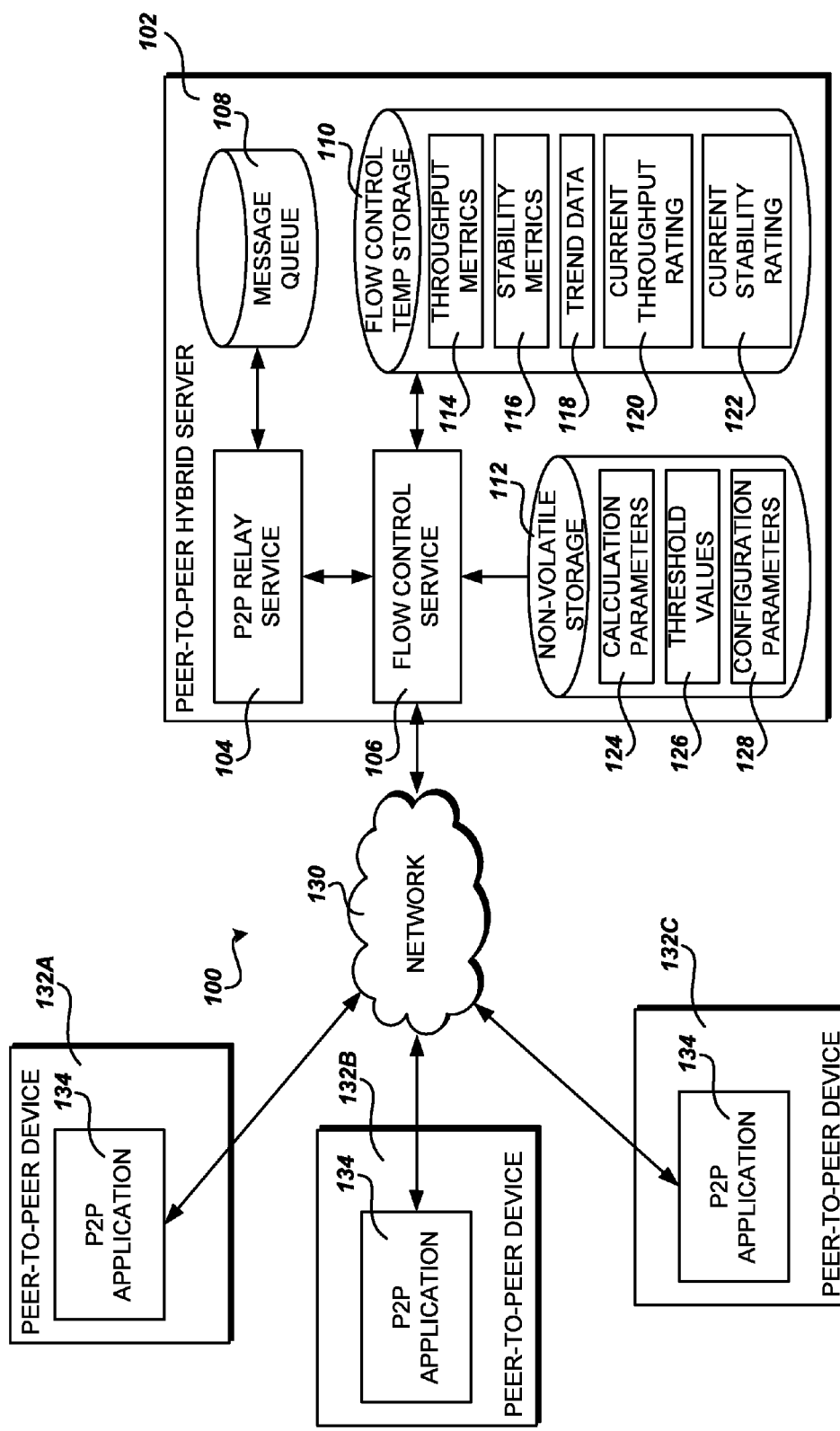
FIG. 1 is a block diagram showing aspects of an illustrative operating environment and several software components provided by the embodiments presented herein.

The following detailed description is directed to technologies for providing dynamic flow control of requests to a server in a hybrid P2P network. Through the use of the technologies and concepts presented herein, a relay server in a hybrid P2P network may implement a dynamic flow control mechanism to prevent instability while attempting to ensure that incoming device messages continue to be forwarded to other connected devices. The mechanism is dynamic in that the server monitors its current processing load and throughput of requests, and continuously adjusts the number of connected devices upon which flow control is imposed based on these current conditions. The current processing load and throughput of requests are determined by the server from a number of metrics collected in these areas over time. The server utilizes these metrics, along with associated trend data, to calculate a current stability rating and throughput rating and then imposes flow control on a subset of connected devices in proportion to the current ratings calculated.

By utilizing the ratings indicating the current conditions of the server to impose flow control, the server can respond to dynamic conditions of throughput and processing load that result from both demands on the relay server from connected peer-to-peer devices as well as external factors, such as other applications processing on the server computer. In addition, including trend data in the calculation of the ratings allows the server to prevent a potentially crippling overload condition by applying proportional flow control as processor load increases before the overload condition occurs. Thus, lesser restrictive measures can be taken earlier ensuring continued server stability while allowing the server to remain available to process device requests.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of a methodology for implementing a dynamic flow mechanism for a server in a hybrid P2P network will be described.

Turning now to FIG. 1, details will be provided regarding an illustrative operating environment and several software components provided by the embodiments presented herein. FIG. 1 illustrates an exemplary system 100 of a hybrid P2P network architecture, including multiple peer-to-peer devices 132A, 132B, 132C, herein referred to collectively as peer-to-peer devices 132. The peer-to-peer devices 132 are operatively connected to a network 130, and each device 132 executes a P2P application 134 that provides for the sharing of documents and other resources among the other peer-to-peer devices 132 connected to the network 130. Also connected to the network 130 is a peer-to-peer hybrid server 102, which executes a P2P relay service 104 that is implemented to service devices 132 for which direct peer-to-peer communication is blocked by network firewalls, proxy devices, or similar obstacles. The relay service 104 is responsible for facilitating device discovery between the remote member devices 132 that make up the P2P network and distributing changes to documents and other messages between the member devices 132. According to one embodiment, the network 130 comprises the Internet. However, it should be appreciated that the network 130 may comprise a LAN, WAN, or other type of network suitable to allow the peer-to-peer devices 132 to communicate with each other and the server 102. It may be further appreciated that many more networks and network connections may be utilized than illustrated in FIG. 1.

The P2P relay service 104 may provide a "store and forward" service that accepts message requests from peer-to-peer devices 132 and temporarily stores them in a message queue 108 for retrieval by other member devices 132. For example, if an individual peer-to-peer device 132A is unable to directly connect to other peer devices 132B, 132C over the network 130, and the device 132A detects a change to a resource which it owns, it will send change messages destined for the other peer devices 132B, 132C to the relay service 104, which places the change messages in the message queue 108. If one of the destination peer-to-peer devices 132B is currently connected to the relay service 104 at the time the change messages are received, the relay service 104 will immediately forward the change message to the device 132B so that the resources of the device 132B may be synchronized by incorporating the change. However, if another of the destination peer-to-peer devices 132C is not connected to the relay service 104 at the time the change messages are received, the change message for that device 132C will remain in the message queue 108 until the device 132C comes online, at which point the relay service 104 will forward the change message to the device 132C. One example of such a relay service 104 is the MICROSOFT OFFICE GROOVE SERVER from MICROSOFT CORPORATION of Redmond, Wash.

It will be appreciated that the relay service 104 may process message requests from thousands of connected peer-to-peer devices 132 participating in multiple, virtual hybrid P2P networks, and that the resulting processing load has the potential to overload the available resources of the peer-to-peer hybrid server 102, causing instability in the server 102 or even a failure or "crash". Because the P2P hybrid network 100 depends upon the relay service 104 for the synchronization of changes between the individual peer-to-peer devices 132, it is desirable to implement a mechanism which can control the overall throughput of message requests from the peer-to-peer devices 132 to prevent this overload condition from occurring at the server 102, while at the same time maintaining the highest degree of availability of the relay service 104 as possible.

In order to efficiently control the flow of messages to the relay service 104, a flow control service 106 is implemented on the peer-to-peer hybrid server 102. As will be described in greater detail below in regard to FIG. 2, the flow control service 106 monitors the overall load of the server 102 and imposes flow control on a subset of the connected peer-to-peer devices 132 having the greatest impact on the server 102. The flow control service 106 collects a number of throughput metrics 114 reflecting the current throughput of requests to the relay service 104 and stability metrics 116 reflecting the current processing load of the server 102. The flow control service 106 stores these metrics 114, 116 in temporary storage 110 of the server 102, and utilizes the metrics 114, 116 to calculate a current throughput rating 120 and a current stability rating 122, according to one embodiment. The method of calculating these ratings 120, 122 may be driven by a set of configurable calculation parameters 124, which are contained in non-volatile storage 112 on the server 102. In another embodiment, the flow control service 106 also computes trend data 118 for the collected metrics 114, 116 held in temporary storage 110 over time, and includes this trend data 118 in the calculation of the current ratings 120, 122.

Flow control may be imposed on a number of connected peer-to-peer devices 132 depending on the current ratings 120, 122 calculated for the server 102, as will be discussed in more detail below in regard to FIG. 3. According to embodiments presented herein, the number of devices 132 upon which flow control is imposed is determined by comparing the current ratings 120, 122 to configured threshold values 126 and by utilizing other configuration parameters 128. The threshold values 126 and configuration parameters 128 are also stored in the non-volatile storage 112 on the server 102.

In one embodiment, flow control may be imposed upon an individual peer-to-peer device 132 through the use of a command that is provided by the protocol used by the P2P application 134 executing on the device 132 to connect to the P2P relay service 104. For example, the Simple Symmetric Transmission Protocol (SSTP) utilized by GROOVE clients to communicate with the GROOVE SERVER includes a facility that allows the server to communicate an instruction to an individual client to temporarily limit its rate of message requests. Once the command is removed from the communications between the client and the server, the client can return to sending unlimited message requests. In alternative embodiments, the flow control service 106 may impose flow control by limiting the number of available connections at the relay service 104 for new device 132 connections, or limiting the number of requests that will be serviced from a particular device 132 over a specific period of time. It will be appreciated that the flow control service 106 may further utilize any number of methods commonly known in the art to impose flow control on the connected peer-to-peer devices 132.

While the P2P relay service 104 and flow control service 106 discussed above are illustrated in FIG. 1 as executing on a single peer-to-peer hybrid server 102, it will be appreciated that these components may be distributed across a number of operatively connected servers or computing devices, as required by a particular implementation. It will be further appreciated that, while the flow control service 106 illustrated in FIG. 1 is described as operating in conjunction with a P2P relay service 104 in a hybrid peer-to-peer network 100, the methods and technologies described herein may be utilized by any type of server that services requests from multiple clients to impose flow control on a number of the clients based upon the current operating load of the server.

Figure 2:
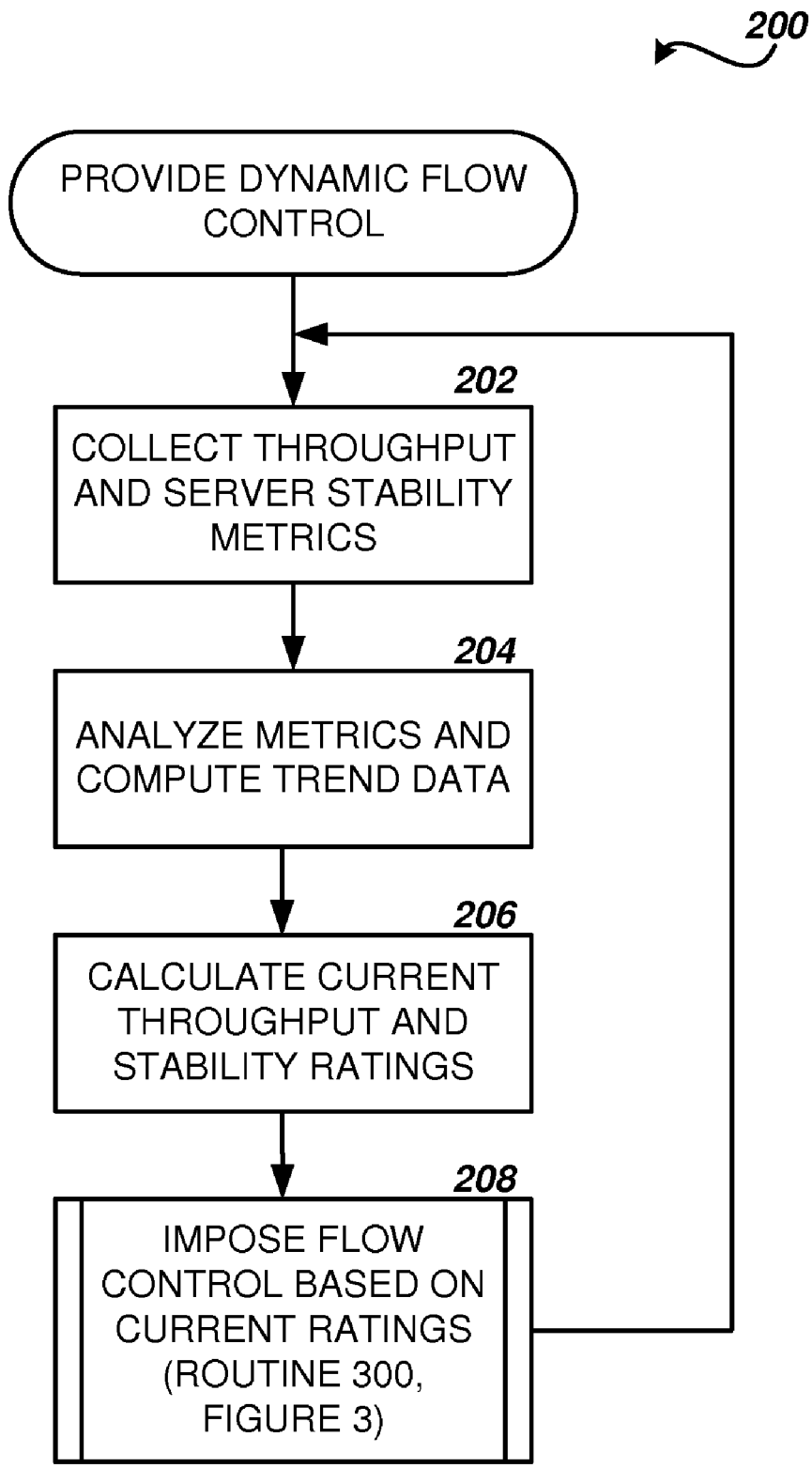
FIGS. 2 and 3 are flow diagrams showing aspects of the process for providing dynamic flow control in a hybrid peer-to-peer network, as provided in the embodiments described herein.
Figure 3:
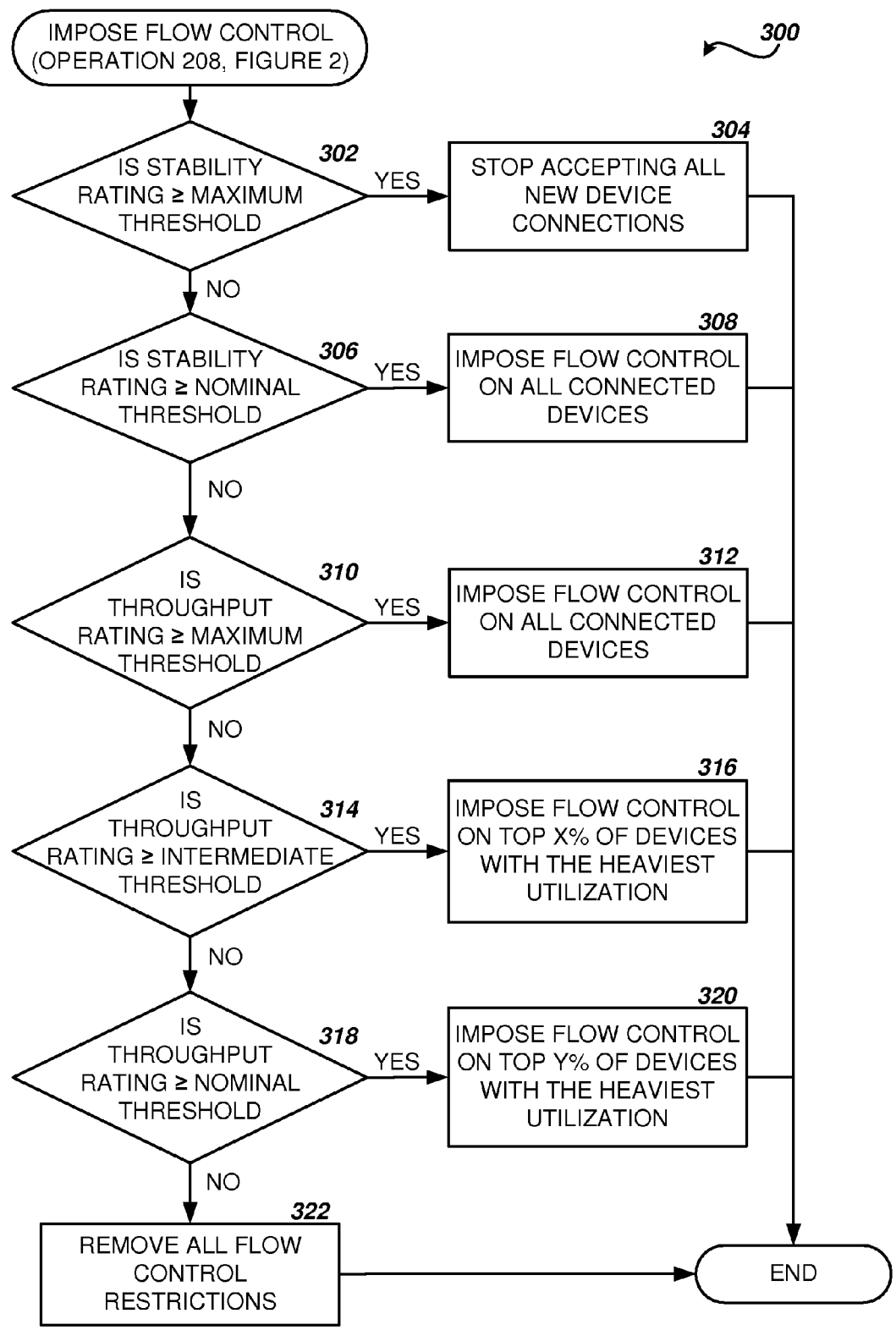

Referring now to FIGS. 2 and 3, additional details will be provided regarding the embodiments presented herein for providing dynamic flow control of requests to a server in a hybrid P2P network. In particular, FIG. 2 is a flow diagram illustrating the iterative process of collecting server metrics 114, 116, developing trend data 118 from the metrics 114, 116, calculating current ratings 120, 122 from the metrics 114, 116 and trend data 118, and imposing flow control on a subset of connected devices 132 based upon the current ratings 120, 122. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, wherein the flow control service 106 collects a number of metrics 114, 116 indicating the overall processing load on the server 102. In one embodiment, the flow control service 106 collects throughput metrics 114 indicating the amount of work the relay service 104 is performing on behalf of the connected peer-to-peer devices 132. Examples of throughput metrics 114 include the total number of requests received from a device 132 during the time the device 132 is connected to the relay service 104, the total amount of data in bytes received from the device 132, the total amount of data in bytes sent to the device 132, the current request rate from the device 132 in requests per second, and the current I/O bandwidth for the device 132 in bytes per second. These metrics 114 are collected for each connected device 132 and aggregated as well to provide total metrics for the relay service 104. The total throughput metrics 114 for the relay service 104 are utilized to calculate the current ratings 120, 122 for the server 102, as discussed below in regard to operation 206, while the individual device throughput metrics 114 are used to determine upon which connected devices 132 to impose flow control, as discussed in more detail below in regard to FIG. 3.

In another embodiment, the flow control service 106 collects stability metrics 116 indicating how hard the peer-to-peer hybrid server 102 is working. These metrics may include current CPU utilization, as a percentage, the current paging rate, in pages per second, the current disk I/O requests per second, the current database transactions per second, the current size in bytes of the outstanding disk queue, and the current size in bytes of free non-paged memory on the server 102. Unlike the throughput metrics 114 described above, the stability metrics 116 represent the current processing load on the server 102 hardware, and are not limited simply to the load caused by the relay service 104. This allows for the stability rating 122 calculated from these metrics 116 to reflect the stability and load on the entire server 102, including the impact of other applications executing on the server 102 in conjunction with the relay service 104. In further embodiments, the metrics collected by the flow control service 106 may include a combination of the throughput metrics 114 and the stability metrics 116, or any number of other metrics commonly known in the art that indicate the overall processing load on the server 102.

From operation 202, the routine 200 proceeds to operation 204, where the flow control service 106 analyzes the collected metrics 114, 116 to compute trend data 118, according to one embodiment. As will become apparent below, the routine 200 is an iterative process that is repeated on a continuous basis during the operation of the server 102. Therefore, the server flow control service 106 will maintain in temporary storage 110 metric values 114, 116 taken at various points in time, or data points. The flow control service 106 may utilize the metric values 114, 116 collected at these data points to compute trends for each of the collected metrics 114, 116 and use the trend data 118 in addition to the current metrics 114, 116 to calculate the current ratings 120, 122 for the server 102, as discussed below in regard to operation 206. Trend data 118 for a particular metric may include an average of the metric value over a period of time, as well as a current rate of change for the metric value, expressed as a ratio of the current metric value to the metric value from a previous data point. By utilizing the trend data 118 in the calculation of the current ratings 120, 122 for the server 102, the flow control service may be able to detect a pending overload condition on the server 102, and impose flow control on a number of connected devices 132 in order to prevent the overload from occurring. For example, while a particular value of the paging rate metric may not be elevated to a level to warrant an immediate response, a rapidly increasing paging rate trend coupled with a low number of free, non-paged bytes of memory available on the server 102 may indicate that the server 102 is beginning to thrash, which may dramatically decrease the performance of the server 102 if not addressed immediately.

Next, the routine 200 proceeds from operation 204 to operation 206, where the flow control service 106 calculates one or more current ratings 120, 122 indicating the relative load of the server 102 from the collected metrics 114, 116 and trend data 118. In one embodiment, the flow control service 106 calculates both a current throughput rating 120 indicating the relative throughput of message requests from the connected devices 132 to the relay service 104, and a current stability rating 122 indicating the relative stability of the server 102. It will be appreciated that the flow control service 106 may calculate just one of the current ratings 120, 122 described, or any number of additional current ratings as may be supported by the collected metrics 114, 116 and trend data 118 maintained in temporary storage 110.

The flow control service 106 calculates the current throughput rating 120 from the collected throughput metrics 114 and associated trend data 118 utilizing a method which allows those metrics or trends which are deemed more important to the current throughput rating to be given more weight than others. For example, the calculation of the current throughput rating 120 may be performed using a weighted sum, which may be expressed as:

$$RATING_T = K_1 * RQSTS_{P1} + K_2 * ENQ_{P1} + K_3 * DEQ_{P1} + K_4 * BW$$

where $RATING_T$ represents the current throughput rating of the server 102; $RQSTS_{P1}$ represents the total number of requests received by the relay service 104 from the connected devices 132 during some time interval P1, $ENQ_{P1}$ represents the total amount of data in bytes received from the connected devices 132 during the time interval P1; $DEQ_{P1}$ represents the total amount of data in bytes sent to the connected devices 132 over the time interval P1; and BW represents the current I/O bandwidth for all connected devices 132 in bytes per second. The coefficients $K_1$, $K_2$, $K_3$, and $K_4$ are weighting factors that allow the individual terms described above to be weighted differently in the calculation to further optimize the resulting current throughput rating 120. In one embodiment, the coefficients $K_1$, $K_2$, $K_3$, and $K_4$ are stored as calculation parameters 124 in non-volatile storage 112 of the server 102 and are capable of being adjusted by server administrator personnel as needed to optimize the performance and availability of the server 102 and relay service 104.

In alternative embodiments, the flow control service 106 may use a weighted average to calculate the current throughput rating 120 from the metrics and trends described above, and a trend may be used as individual term in the weighted sum or weighted average, or may be used as a weighting factor for its associated metric. For example, the $RQSTS_{P1}$ term described above may be weighted not only by the coefficient $K_1$ but also by a ratio indicating the current rate of change for the total number of requests metric value. It will be appreciated that the method used by the flow control service 106 to calculate the current throughput rating 120 may involve any number of the metrics 114, 116 and trend data 118 maintained by the flow control service 106 in temporary storage 110, as well as any number of coefficients or other calculation parameters 124 stored in non-volatile storage 112 of the server 102. It will be further appreciated that the current throughput rating 120 may be calculated from these metrics 114, 116, trend data 118, coefficients, and calculation parameters 124 by a variety of mathematical or statistical methods commonly know in the art.

According to another embodiment, the flow control service 106 also calculates the current stability rating 122 from the collected stability metrics 116, the associated trend data 118, and a number of coefficients and other calculation parameters 124 stored in non-volatile storage 112 of the server 102, utilizing a methodology similar to that of the current throughput rating 120 described above. After the flow control service 106 calculates the current ratings 120, 122, the routine 200 proceeds from operation 206 to operation 208, where the flow control service 106 imposes flow control on a number of the currently connected peer-to-peer devices 132, which will be described in detail below in regard to FIG. 3.

From operation 208, the routine 200 returns to operation 202, where the process is repeated iteratively. The effect of this iterative process is that the flow control methodology described operates as a closed-loop feedback system, with flow control being imposed in proportion to the current ratings 120, 122 calculated for the server 102, affecting the overall processing load on the server 102, which is consequently reflected in the collected metrics 114, 116 and trend data 118 used in the calculation of ratings 120, 122 in subsequent iterations. In addition, the overall load of the server 102 and availability of the relay service 104 can be monitored over time, and the coefficients and other calculation parameters 124 stored on the server 102 can be adjusted accordingly to provide the highest availability of the relay service 104 possible without the server 102 experiencing an overload condition or failure.

In various embodiments described herein, the flow control service 106 imposes flow control on a number of the connected peer-to-peer devices 132 that is in proportion to the current ratings 120, 122 calculated by the flow control service 106 for the server 102. Further, the flow control service 106 may select the proportional number of devices 132 having the greatest impact on the processing load of the server 102 upon which to impose flow control. FIG. 3 illustrates one embodiment of the operation of imposing flow control on a subset of connected devices 132 based on the current ratings 120, 122. The routine 300 starts at operation 302, where the flow control service 106 determines whether the current stability rating 122 meets or exceeds a maximum stability threshold value 126 configured for the server 102 and stored in the non-volatile storage 112. This condition may represent that the server 102 is very unstable and approaching an overload or other failure condition. If the current stability rating 122 meets or exceeds the maximum stability threshold value 126, then the routine 300 proceeds from operation 302 to operation 304, where the flow control service 106 causes the relay service 104 to refuse all new connections from peer-to-peer devices 132. While this imposition of flow control represents a reduction in the availability of the relay service 104, it may be necessary in the face of a pending failure condition indicated by the current stability rating 122 exceeding the maximum stability threshold value 126.

If the current stability rating 122 does not meet the maximum stability threshold value 126, the routine 300 proceeds from operation 302 to operation 306 where the flow control service 106 determines if the current stability rating 122 meets or exceeds a nominal stability threshold value 126 further configured for the server 102. This condition may indicate that, while no pending overload condition exists, the server 102 is still sufficiently loaded such that action should be taken in order to prevent further degradation in the stability of the server 102. Such may be the case, for example, if an application other than the relay service 104 is temporarily consuming resources on the server 102. If the current stability rating 122 meets or exceeds the nominal stability threshold value 126, the routine 300 proceeds from operation 306 to operation 308, where the flow control service 106 imposes flow control on all connected devices 132. This ensures that the relay service 104 remains available to service all presently connected devices 132 as well as any new device connections, while at the same time reducing the overall demand on the server 102.

If the current stability rating 122 is under the nominal stability threshold value 126, the routine 300 then proceeds from operation 306 to operation 310, where the flow control service 106 determines if the current throughput rating 120 meets or exceeds a maximum throughput threshold value 126, indicating that the relay service 104 is at maximum capacity in processing requests from peer-to-peer devices 132. If this maximum throughput threshold value 126 is exceeded by the current throughput rating 120, the routine 300 proceeds from operation 310 to operation 312, where the flow control service 106 imposes flow control on all connected devices 132, just as above. If, however, the current throughput rating 120 does not meet the maximum throughput threshold value 126, the routine 300 then proceeds from operation 310 to operation 314, where the flow control service 106 determines if the current throughput rating 120 meets or exceeds an intermediate throughput threshold value 126.

At operation 314, if the current throughput rating 120 meets or exceeds the intermediate throughput threshold value 126, then the routine 300 proceeds to operation 316, where the flow control service 106 imposes flow control on a greater percentage (i.e. where X % used in operation 316 is greater than Y % used in operation 320) of the connected devices 132 with the heaviest demand on the relay service 104. The relative demand of each device 132 on the relay service 104 may be determined by evaluating the individual throughput metrics 114 collected for each device 132 by the flow control service 106, as discussed above in regard to FIG. 2. The flow control service 106 may retrieve the percentage of connected devices upon which to impose flow control associated with the intermediate throughput threshold value 126 from the configuration parameters 128 stored in non-volatile storage 112 on the server 102. For example, the flow control service 106 may select 40% of the connected devices 132 having the highest current I/O bandwidth for the imposition of flow control when the intermediate throughput threshold for the throughput rating 120 is met or exceeded, according to one embodiment.

If the current throughput rating 120 does not meet the intermediate throughput threshold value 126, the routine 300 then proceeds from operation 314 to operation 318, where the flow control service 106 determines if the current throughput rating 120 meets or exceeds a nominal throughput threshold value 126. If so, then the routine 300 proceeds to operation 320, where the flow control service 106 imposes flow control on a lesser percentage (i.e. where Y % in operation 320 is less than X % in operation 316) of devices 132 having the heaviest, reflecting the fact that, while the current throughput rating 120 meets or exceeds the nominal throughput threshold value 126, it is still under the intermediate throughput threshold value 126, and thus a less limiting response is appropriate to control the stability and throughput of the relay service 104 and server 102. It will be appreciated that any number of intermediate threshold values 126 can be used in the routine 300, with different associated percentages of connected devices. This allows the flow control service to impose flow control in a proportional way based on the current throughput rating 120 or stability rating 122.

Continuing from operation 318, if the flow control service 106 determines that the current throughput rating 120 does not meet the nominal throughput threshold value 126 and the current stability rating 122 does not meet the nominal stability threshold value 126, the flow control service 106 concludes that the overall processing load on the server does not currently warrant that any preventive action is to be taken. Accordingly, the routine 300 proceeds to operation 322, where any flow control restrictions imposed in prior iterations of the cycle are removed.

Figure 4:
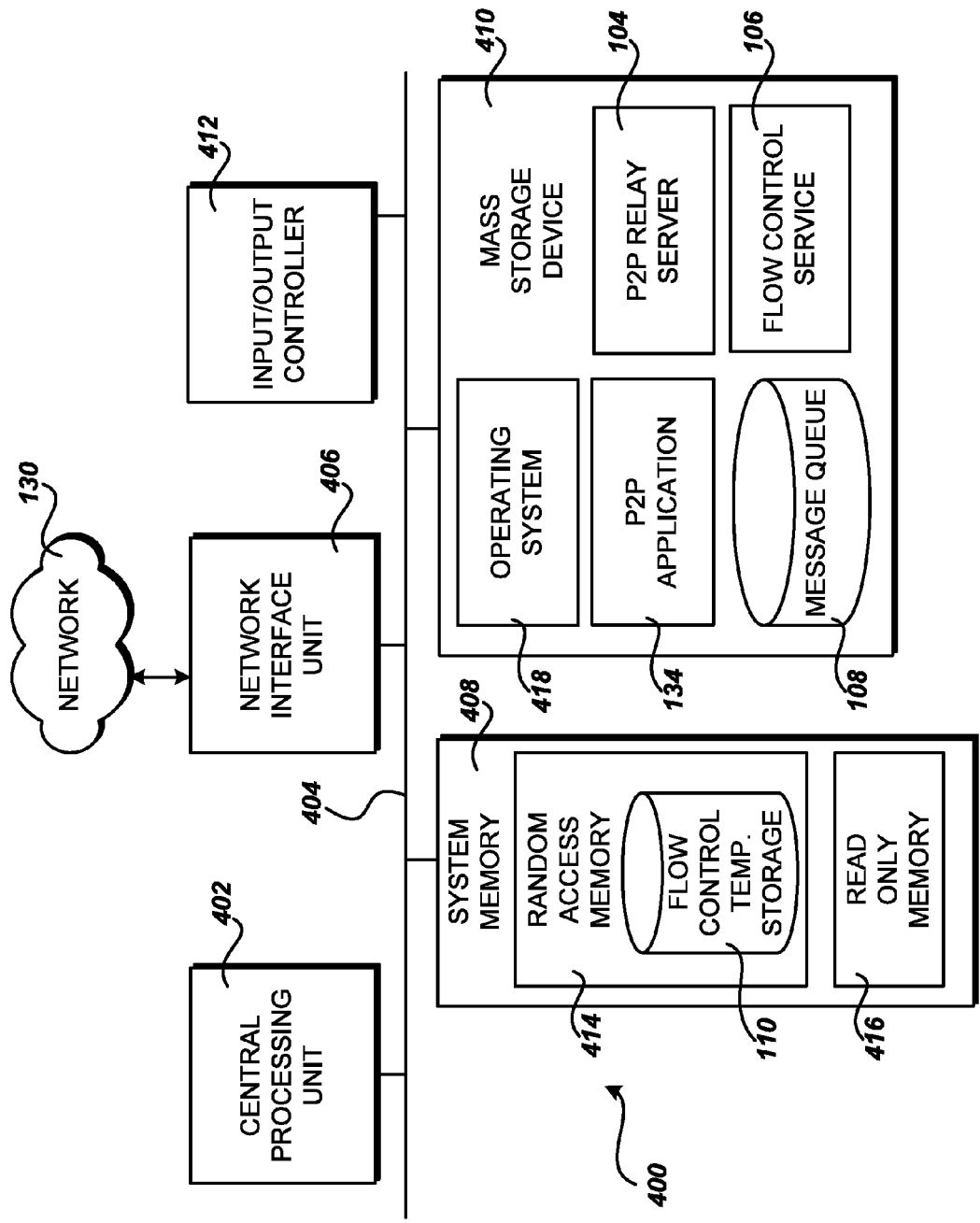
FIG. 4 is a block diagram showing an illustrative computer hardware and software architecture for a computing system capable of implementing aspects of the embodiments presented herein.

FIG. 4 shows an illustrative computer architecture for a computer 400 capable of executing the software components described herein for providing dynamic flow control in a hybrid peer-to-peer network in the manner presented above. The computer architecture shown in FIG. 4 illustrates a conventional desktop, laptop, or server computer and may be utilized to execute any aspects of the software components presented herein described as executing on the peer-to-peer hybrid server 102 or peer-to-peer devices 132.

The computer architecture shown in FIG. 4 includes a central processing unit 402 ("CPU"), a system memory 408, including a random access memory 414 ("RAM") and a read-only memory 416 ("ROM"), and a system bus 404 that couples the memory to the CPU 402. A basic input/output system containing the basic routines that help to transfer information between elements within the computer 400, such as during startup, is stored in the ROM 416. The computer 400 also includes a mass storage device 410 for storing an operating system 418, application programs, and other program modules, which are described in greater detail herein.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 130. The computer 400 may connect to the network 130 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. In particular, the mass storage device 410 and the RAM 414 may store the P2P relay service 104, the flow control service 106, or the P2P application 134 programs, each of which was described in detail above with respect to FIG. 1. In addition, the mass storage device 410 and the RAM 414 may store the flow control temporary storage 110 and the message queue 108, also described above with respect to FIG. 1. The mass storage device 410 and the RAM 414 may also store other types of program modules or data.

Based on the foregoing, it should be appreciated that technologies for providing dynamic flow control of requests to a server in a hybrid peer-to-peer network are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing dynamic flow control of requests from a plurality of client computers to a server computer, the method comprising:
   collecting throughput metrics indicating a current number and size of the requests;
   collecting a stability metric indicating a current processing load of the server;
   calculating a throughput rating indicating a current throughput of the requests from the plurality of client computers from the throughput metric;
   calculating a stability rating indicating the current processing load of the server from the stability metric;
   imposing flow control on a first subset of the plurality of client computers if the throughput rating or the stability rating is above a first threshold value; and
   imposing flow control on a second subset of the plurality of client computers if the throughput rating or the stability rating is above a second threshold value.

2. The method of claim 1 further comprising:
   calculating trend data for the throughput metric and the stability metric;
   calculating the throughput rating from the throughput metric and the trend data; and
   calculating the stability rating from the stability metric and the trend data.

3. The method of claim 1, wherein the first subset and the second subset each comprise a percentage of the plurality of client computers having a largest throughput of requests.

4. The method of claim 1, where imposing flow control on a subset of the plurality of client computers comprises sending a protocol command to each of the subset of the plurality of client computers instructing the client computer to limit the number of requests sent to the server.

5. The method of claim 1, where imposing flow control on a subset of the plurality of client computers comprises imposing a limit on a number of requests that will be processed for each of the subset of the plurality of client computers.

6. The method of claim 1, where imposing flow control on a subset of the plurality of client computers comprises imposing a limit on a number of connections available for the plurality of client computers.

7. A computer storage medium having computer executable instructions stored thereon, which, when executed by a computer, will cause the computer to:
   collect a plurality of metrics indicating a current processing load of the computer;
   calculate trend data for the plurality of metrics;
   calculate a rating from the plurality of metrics and the trend data;
   determine if the rating is greater than or equal to a maximum threshold value;
   if the rating is greater than or equal to the maximum threshold value, impose flow control on a plurality of client computers;
   if the rating is not greater than or equal to the maximum threshold value, determine if the rating is greater than or equal to a nominal threshold value; and
   if the rating is greater than or equal to the nominal threshold value, impose flow control on a subset of the plurality of client computers comprising a first percentage of the client computers having a largest throughput of requests.

8. The computer storage medium of claim 7 having additional computer executable instructions stored thereon, which, when executed by the computer, cause the computer to:
   determine if the rating is greater than or equal to an intermediate threshold value; and
   if the rating is greater than or equal to the intermediate threshold value, impose flow control on a subset of the plurality of client computers comprising a second percentage of the client computers having the largest throughput of requests,
   wherein the second percentage is larger than the first percentage.

9. The computer storage medium of claim 7, wherein the plurality of metrics comprises one or more of a total number of requests to the computer from the plurality of client computers over a period of time, a total size of requests to the computer from the plurality of client computers over the period of time, a percentage of processor utilization of the computer, a rate of paging of a virtual memory of the computer, a rate of disk read and write requests at the computer, a rate of database transactions from the computer, and a number of bytes of free memory remaining in the computer.

10. The computer storage medium of claim 7, wherein imposing flow control on the plurality of client computers comprises sending a protocol command to each of the plurality of client computers instructing the client computer to limit the throughput of requests to the computer.

11. The computer storage medium of claim 7, wherein imposing flow control on the plurality of client computers comprises limiting a number of requests accepted from each of the plurality of client computers over a period of time.

12. The computer storage medium of claim 7, where imposing flow control on the plurality of client computers comprises imposing a limit on a number of connections available for the plurality of client computers.

13. A method for providing dynamic server flow control in a hybrid peer-to-peer network, the method comprising:
  collecting a plurality of metrics indicating a current load upon a server connected to a plurality of peer-to-peer devices;
  calculating trend data for each of the plurality of metrics;
  calculating a current load rating from the plurality of metrics and the trend data;
  determining whether the current load rating is greater than or equal to a maximum threshold value;
  if the current load rating is greater than or equal to the maximum threshold value, imposing flow control on all of the plurality of peer-to-peer devices;
  if the current load rating is not greater than or equal to the maximum threshold value, determining if the current load rating is greater than or equal to a nominal threshold value;
  if the current load rating is greater than or equal to the nominal threshold value, imposing flow control on a subset of the plurality of peer-to-peer devices comprising a percentage of peer-to-peer devices having a largest number of requests or a largest size of requests over a period of time; and
  if the current load rating is not greater than or equal to the nominal threshold value, imposing no flow control on the plurality of peer-to-peer devices.

14. The method of claim 13, wherein the plurality of metrics comprise a total number of requests to the server from the plurality of peer-to-peer devices over a period of time and a total size of requests to the server from the plurality of peer-to-peer devices over the period of time.

15. The method of claim 13, wherein the percentage of peer-to-peer devices is proportional to the current load rating.

16. The method of claim 13, where imposing flow control on the subset of the plurality of peer-to-peer devices comprises sending a protocol command to each of the subset of the plurality of peer-to-peer devices instructing the peer-to-peer device to limit the number or the size of requests to the server.

17. The method of claim 13, wherein the plurality of metrics comprise one or more of a percentage of processor utilization, a rate of paging of virtually memory, a rate of disk read and write requests, a rate of database transactions, and a number of bytes of free memory remaining.

* * * * *